(12) United States Patent
Irwin

(10) Patent No.: US 6,511,395 B1
(45) Date of Patent: Jan. 28, 2003

(54) SENSOR THRUST WASHER

(75) Inventor: Earl James Irwin, Fort Wayne, IN (US)

(73) Assignee: Spicer Technology, Inc., Fort Wayne, IN (US)

( * ) Notice: Subject to any disclaimer, the term of this patent is extended or adjusted under 35 U.S.C. 154(b) by 15 days.

(21) Appl. No.: 09/818,609

(22) Filed: Mar. 28, 2001

(51) Int. Cl.$^7$ .......................... F16H 48/30; H02K 19/24
(52) U.S. Cl. ........................................ 475/150; 310/168
(58) Field of Search ................................ 310/155, 168; 324/174; 188/181 A, 181 R; 475/150

(56) References Cited

U.S. PATENT DOCUMENTS

| | | | |
|---|---|---|---|
| 3,138,970 A | | 6/1964 | Costa et al. |
| 3,604,966 A | | 9/1971 | Liggett |
| 3,719,841 A | * | 3/1973 | Ritsema ...................... 310/155 |
| 3,769,533 A | | 10/1973 | Pauwels |
| 3,927,339 A | * | 12/1975 | Paul et al. ................... 310/155 |
| 4,953,670 A | | 9/1990 | Chemelewski |
| 5,451,188 A | | 9/1995 | Kraft et al. |
| 5,486,757 A | | 1/1996 | Easley |

* cited by examiner

*Primary Examiner*—Christopher P. Schwartz
(74) *Attorney, Agent, or Firm*—Liniak, Berenato & White

(57) ABSTRACT

A speed-sensing system for a differential assembly, wherein a tone ring positioned on the ring gear flange is eliminated and the speed-sensing equipment is specially placed in the form of a thrust washer and/or slinger with a tone sensing ring disposed between the yoke and the inner race of the pinion shaft to avoid bending distortions of the ring gear under various dynamic load conditions.

12 Claims, 1 Drawing Sheet

SENSOR THRUST WASHER

BACKGROUND OF THE INVENTION

1. Field of the Invention

This invention relates to motor vehicle speed sensors for differential assemblies. More specifically, this invention relates to an apparatus for sensing the rotational speed of the pinion shaft during all gear ratios.

2. Description of Related Art

Typical speed sensors consist of at least one magnet mounted in a protected environment on the stationary portion of the vehicle and a toothed or slotted metal rotor which rotates in response to the wheel movement. As the rotor teeth or slots pass the sensing device, variations in the magnetic flux produce a voltage the frequency of which is a function of the angular velocity of the wheel and the number of teeth or slots in the rotor.

In order to generate a voltage level which provides an accurate indication of the speed, the sensing device and the rotor must be accurately positioned with respect to one another during initial assembly and they must remain in this relationship even after extended periods of operation in which the components are subjected to road shocks and repeated vibrations. Therefore, most wheel speed sensors are mounted in the area of the wheel. However, such a location requires that additional care be taken not to damage the sensor during wheel maintenance.

The need exists for an improved speed sensing apparatus and method that provides speed sensing during all gear ratios.

SUMMARY OF THE INVENTION

The present invention provides an apparatus for sensing the rotational speed of the pinion shaft, and thus the axles, during all gear ratios.

It is object of the present invention to provide a wheel speed sensors having improved reliability and freedom from signal irregularities, combined with low cost. These factors are met in order for the system to provide enhanced economic benefits. Consequently, it is an object of the present invention to provide wheel speed sensors at minimum cost while providing maximum reliability and freedom from environmental problems.

It is a further object of the invention to provide wheel speed sensors that are essentially free of run out or deflections that could cause signal variation or create spurious signals.

In the speed-sensing system of the invention, a tone ring positioned on the ring gear flange is eliminated and the speed-sensing equipment is specially placed in the form of a thrust washer and/or slinger with a tone sensing ring disposed between the yoke and the inner race of the pinion shaft to avoid bending distortions of the ring gear under various dynamic load conditions.

These advantages and other novel features of the present invention will become apparent in the following detailed description of the invention when considered in conjunction with the accompanying drawings.

BRIEF DESCRIPTIONS OF THE DRAWINGS

A better understanding of the present invention will be had when reference is made to the accompanying drawings, wherein identical parts are identified by identical reference numbers and wherein.

DETAILED DESCRIPTION OF THE PRESENT INVENTION

Figure 1:
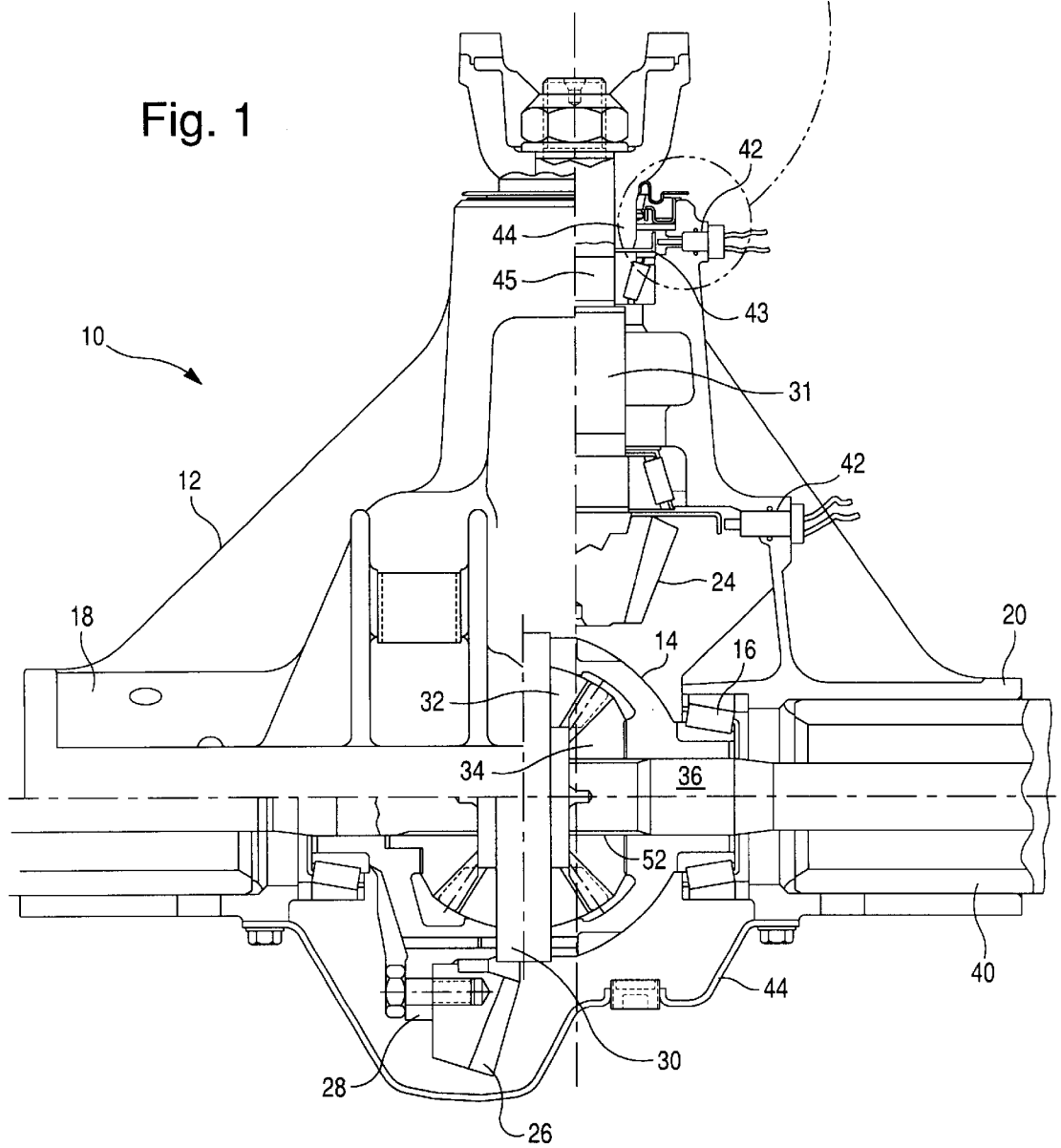
FIG. 1 is a partial cross-sectional view of a differential axle assembly incorporating a speed-sensing system in accordance with the invention.

FIG. 1 shows an axle assembly 10 including a cast iron external housing or carrier 12 which is supported on a vehicle. The carrier 12 rotatably supports a differential case by means of a pair of bearings 16 which are housed within a pair of axially-extending annular trunnion flanges 18 and 20.

Within the case 14 is supported a differential gear set for imparting rotary motion from an input drive shaft to the vehicle axle shafts. The drive axle is connected to a yoke 44 that is turn connected to an inner race 45. The assembly includes a drive pinion gear 24 which is in constant mesh with a ring gear 26 bolted to a ring gear flange 28. In known speed-sensing mechanisms associated with a differentiating axle assembly, there may be mounted a separately machined tone ring (not shown) which is press fit onto the ring gear flange 28. In such a system, the tone ring includes a plurality of machined teeth therein, and a speed sensor is arranged to extend through the differential carrier 12 so as to be adjacent the position of the tone ring on the ring-gear flange. As previously mentioned, such an arrangement requires additional parts, extra tooling and machining, and causes potential seating problems for the extra parts as well as increased runout causing transducer-sensing problems. Tolerances can also be affected by bending distortions of the ring gear under various dynamic load conditions. In the speed-sensing system of the invention, a tone ring positioned on the ring gear flange is eliminated and the speed-sensing equipment is specially placed in the form of a thrust washer with a tone sensing ring 43 disposed between the yoke 44 and the inner race 45 to avoid such problems.

The differential case 14 also houses a cross shaft 30 which in turn supports a pair of rotatable differential pinion gears 32 engaging differential side gears 34 for rotation therewith. The side gears 34 are splined to left and right axle shafts 36, respectively, with only the right-hand side of the axle assembly being shown in the drawings. Differential rotary speeds are imparted to the axle shafts 36 by conventional means. Other known configurations for use in an axle assembly of similar type may also be incorporated within the scope of the present invention.

Before assembly of the axle shafts 36, a pair of steel axle tubes 40 is coupled with the annular trunnion flanges 18 and 20 by conventional means. The axle shafts 36 may then be inserted through axle tubes 40 into driving engagement with the side gears 34 provided in differential case 14.

In the differential housing 12, sensor holes 42 are machined into the annular trunnion flange 18 or 20 at a position adjacent the location of the yoke 44 and the inner race 45. The sensor holes 42 allow for placement of a speed-sensing transducer 46.

Figure 2:
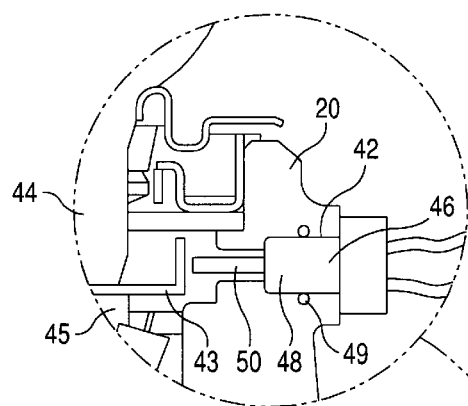
FIG. 2 is an enlarged view of taken within circle X in FIG. 1.

Referring to FIGS. 1 and 2, the speed-sensing transducer 46 includes a sensor body 48 from which extends a transducer pickup 50. The transducer pickup 50 is positioned closely adjacent to the axle shaft 30 of the differential axle assembly 10. An integrally formed thrust washer with a tone sensing ring 43 is disposed between the yoke 44 and the inner race 45. The speed-sensing transducer 46 may include an o-ring or other suitable seal 49 positioned in a groove on the body of transducer 46. The seal 49 engages the side walls of sensor hole 42 to prevent oil leakage from the axle assembly 10. Transducer 46 is rigidly held in position in association with the carrier 12 by conventional means.

Referring to FIG. 2, the speed-sensing transducer 46 may be a variable reluctance transducer positioned in close proximity to a signal generating means which in this embodiment would comprise a integrally formed thrust washer with a tone sensing ring 43. The thrust washer/tone sensing ring 43 is positioned between the yoke 44 and the inner race 45 at a location adjacent the speed-sensing transducer 46. The thrust washer/tone sensing ring 43 provides a signal generator for the transducer 46 to allow measurement of the rotational speed of the pinion shaft 31 as will be appreciated by those skilled in the art. The transducer 46 will produce an electrical output supplied to an electronic control circuit (not shown) which is used to control the rotational speed of the drive shaft 30 as desired.

The speed-sensing differential axle assembly is advantageous in that the speed-sensing transducer 46 is located in a protected environment within the annular trunnion flange 18 or 20. In this configuration, there is less possibility of contamination or corrosion of components for more reliable operation. Additionally, only one hole 42 in the annular trunnion flange 18 or 20 requires minimum additional machining.

While the foregoing invention has been shown and described with reference to several preferred embodiments, it will be understood that various changes in form and detail may be made without departing from the spirit and scope of the present invention. For example, the rather than incorporating the thrust washer and tone sensing ring as stated above, the tone sensing ring can be incorporated with a slinger/deflector/thrush washer rather than the abovementioned thrust washer/tone sensing ring combination.

What is claimed is:

1. A speed sensing system to monitor the speed of wheels of a vehicle, comprising:

a vehicle drive axle assembly including differential carrier and case assembly rotatably mounted within said carrier, said assembly having a pinion shaft delivering an input torque to first and second axle shafts delivering output torque to a pair of wheels, a signal generation means for generating a signal indicative of a rotational speed of said pinion shaft, wherein said signal generation means is a tone sensor ring disposed between a yoke and an inner race of said pinion shaft, and a sensing device mounted in said differential carrier adjacent said signal generating means to independently monitor the rotation of said drive axle to generate a signal proportional to the speed of said drive axle.

2. The speed-sensing system of claim 1, wherein said sensing device has a body portion which extends through said carrier to a position adjacent to said pinion shaft.

3. The speed sensing system claim 2, wherein said body portion including a sealing means to prevent leakage of fluids from said carrier housing.

4. The speed-sensing system of claim 1, wherein said tone sensor ring integrally is secured to a thrust washer.

5. The speed-sensing system of claim 1, wherein said sensing device is a Hall-effect sensor mounted on said carrier so as to be protected from the external environment.

6. The speed sensing system of claim 1, wherein said signal generating means is a tone sensor ring integrally formed as a thrust washer.

7. The speed sensing system of claim 6, wherein said sensor ring is an L-shaped thrust washer disposed around said pinion shaft.

8. The speed sensing system of claim 6, wherein said sensor ring is disposed between a pinion yoke affixed to said pinion shaft and a bearing member disposed on said pinion shaft.

9. A method of assembling a vehicle axle assembly having a wheel-speed sensor associated therewith, comprising the steps of:

providing a differential carrier;

mounting a speed-sensing device on said carrier; and mounting a signal generating device on a pinion shaft between a pinion yoke and a bearing inner race of said pinion shaft;

assembling said pinion shaft through said carrier and into driving engagement with a differential case.

10. The method according to claim 9, wherein said step of mounting said signal generating device comprises mounting at a location coinciding with the position of said speed-sensing means such that said speed-sensing means generates a signal proportional to the rotational speed of said axle shaft.

11. The method according to claim 9, wherein said signal generating device is a tone sensor ring integrally secured to a thrust washer.

12. The method according to claim 5, wherein said signal generating device is a thrush washer formed as a tone sensing ring secured to said pinion shaft.

* * * * *